United States Patent
Muthukrishnan et al.

(10) Patent No.: US 7,461,162 B2
(45) Date of Patent: Dec. 2, 2008

(54) USAGE CONSCIOUSNESS IN HTTP/HTML FOR REDUCING UNUSED DATA FLOW ACROSS A NETWORK

(75) Inventors: Sankara Subbiah Muthukrishnan, Austin, TX (US); Sriram M. Ramanathan, Bangalore (IN); Anandha S. Srinivasan, Bangalore (IN); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 11/014,055

(22) Filed: Dec. 16, 2004

(65) Prior Publication Data

US 2006/0136421 A1    Jun. 22, 2006

(51) Int. Cl.
*G06F 15/16* (2006.01)

(52) U.S. Cl. .................. 709/232; 709/218; 709/221; 709/225; 709/228

(58) Field of Classification Search .......... 709/232
See application file for complete search history.

(56) References Cited

U.S. PATENT DOCUMENTS

| | | | |
|---|---|---|---|
| 6,189,108 B1 | 2/2001 | Cromer et al. | |
| 6,249,812 B1 | 6/2001 | Cromer et al. | |
| 6,266,696 B1 | 7/2001 | Cromer et al. | |
| 6,353,854 B1 | 3/2002 | Cromer et al. | |
| 6,735,628 B2 * | 5/2004 | Eyal | 709/223 |
| 7,130,616 B2 * | 10/2006 | Janik | 455/412.1 |
| 2002/0073238 A1 * | 6/2002 | Doron | 709/246 |
| 2002/0103897 A1 * | 8/2002 | Rezvani et al. | 709/224 |
| 2003/0052911 A1 * | 3/2003 | Cohen-solal | 345/738 |
| 2003/0198184 A1 | 10/2003 | Huang et al. | |
| 2004/0039834 A1 * | 2/2004 | Saunders et al. | 709/231 |

FOREIGN PATENT DOCUMENTS

| | | |
|---|---|---|
| EP | 1 035 708 | 9/2000 |
| EP | 1 248 431 | 10/2002 |
| WO | WO 03/026232 | 3/2003 |
| WO | WO 2004/036845 | 4/2004 |

* cited by examiner

*Primary Examiner*—Jason Cardone
*Assistant Examiner*—Nicholas Taylor
(74) *Attorney, Agent, or Firm*—Dillon & Yudell LLP

(57) ABSTRACT

HTTP/HTML is enhanced to provide information to a server about the current usage level of the continuous data that is being sent to the client. With this information, the server is able to tailor the data being sent to the client based on the current usage level. If the usage level changes in the client system, the server receives information about the changed level and the amount of data being sent is adjusted (up or down) accordingly. The client (browser) is enhanced to determine and send the current usage status and the server is enhanced with the intelligence to tailor the data it sends based on the current usage status received from the client.

13 Claims, 6 Drawing Sheets

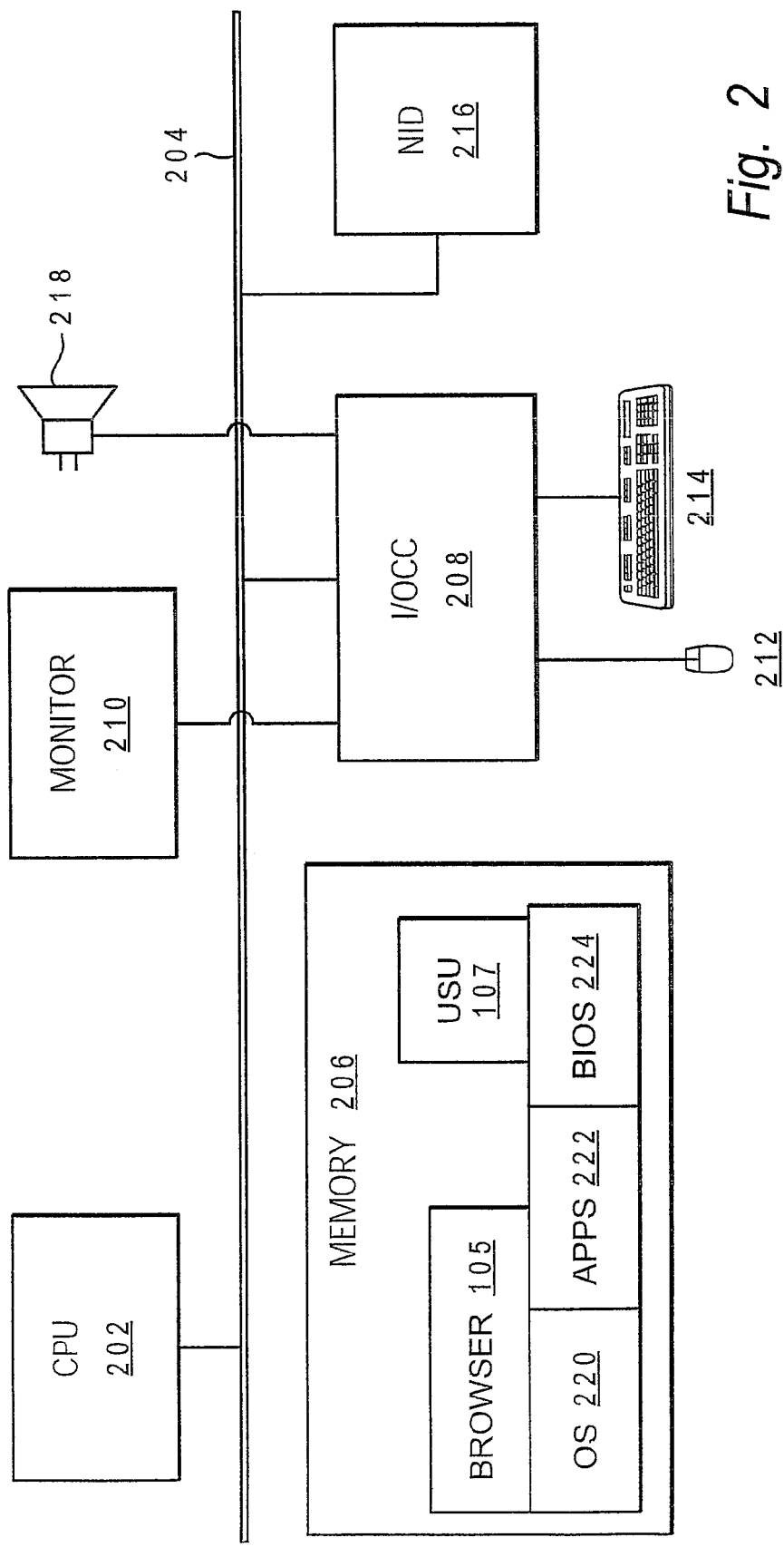

USAGE CONSCIOUSNESS IN HTTP/HTML FOR REDUCING UNUSED DATA FLOW ACROSS A NETWORK

BACKGROUND OF THE INVENTION

1. Technical Field

The present invention relates generally to computer systems and more specifically to computer networks. Still more particularly, the present invention relates to a method, system, and program product for controlling transmission of information across a computer network.

2. Description of the Related Art

The Internet has become the fastest growing and largest network in the world. As the premier communication network, the proliferation of information across the internet is increasing at a very rapid pace. The specific use of the Internet is also expanding, moving from providing traditional static content to now providing more dynamic content, such as audio and video streams.

Those skilled in the art are familiar with the Internet and the method by which the Internet operates. For example, it is well know that the Internet comprises multiple servers, each having specific content that is provided to remote clients who access the server via a universal resource locator (URL) or web address as it is commonly called. The clients typically access and display the content of the web site (web pages identified by the URL) via a web browser (or browser, for short).

The web site content is typically web pages created with the conventional hypertext markup language (HTML) documents or more recently extensible markup language (XML) documents. These web pages are transmitted to the requesting client via the hypertext transfer protocol (HTTP). HTTP operates with HTML as payload and also supports the inclusion within the HTML document of meta tags, etc. HTTP, XML, and HTML, etc. as well as general descriptions of the Internet may be found at world wide web site (www) "w3.org".

Presently, there are many web servers (web sites) that accept specific HTTP requests (i.e., from a client via a browser) and responds by sending back to the client web pages that are continuously updated. Accessing WWW from clients (browsers) works based on a request-response architecture enforced by HTTP, and some requests result in prolonged continual responses from the web server, like self-refreshing pages, audio/video streaming etc. Example web sites that provide this type of continuously updated web pages include web sites serving live sports action, websites streaming audio and/or video content, websites providing news updates, and web sites with changing financial content (such as the United States stock market website), etc. In each case, a client typically sends out a single initial request for access to the content and the server responds by continually providing multiple different (ever changing) pages/data until the client closes the web browser or browses away from the web site.

The server operates as an unintelligent information source that responds to a client request by continually sending the web pages or streaming content to the network address that identifies the particular client/browser. The server does not have any information on whether the client (or user of the client) is actually utilizing the data that is being sent to the client. In fact, but for some timeout mechanism with some web sites (particularly those with secure information/data), the server may continue to send the web pages to the client system indefinitely.

For example, if a user has requested the live scores of a basketball match, the server keeps sending the updated scores at the regular intervals as long as the client (browser) is up (i.e., executing on the processor of the client) and the user has not used the browser to request another web page of some other server. In fact, one trick known to many users of client browsers is that of selecting the file menu option to open a new browser, and browsing away from the first server to a second server on the second open browser. The original browser remains open in the background and the first server content continues to be received but is not utilized.

Also, conventional operating systems (OS) allow the user to minimize the browser application and/or open up any other application on the client system. When this occurs with current browsers, the server continues to send the content to the client even though the user is not actually using/viewing the content.

Many servers have a finite limit on the number of clients that can be supported at one time. With bandwidth issues a real concern for most networks, including the networks of the various Internet providers, having the server continue to stream high bandwidth content to a client whose browser is minimized or hidden behind a second browser or second application window is a waste of bandwidth and causes an unnecessary drain on server/network resources.

The present invention thus recognizes that it would be desirable to be able to be able to detect when a client browser or user is not using the continuously updated web pages provided by a server. A method and system that enables a throttling of streaming content to a client when the client/content is not being actively utilized would be a welcomed improvement. It would be further desirable if there was some mechanism by which a server is alerted when to suspend or throttle sending continuous updates to a client browser based on a current usage attribute of the client browser. These and other benefits are provided by the invention described herein.

SUMMARY OF THE INVENTION

Disclosed is a method, system, and computer program product for enabling a server to detect when a client browser or user is not using the continuously updated web pages provided by the server and responding by throttling/suspending the transmission of new content to the client when the client's interface device (e.g., browser) or the content is not being actively utilized. Using a combination of predefined operating conditions, the client browser determines a current usage attribute of the client interface device and received content. The current usage attribute is a calculated number that represents the usage level by the client browser of the content being continually update/transmitted by the server and received at the client interface device. In one embodiment, the attribute is calculated when a ping is received from the server.

A software utility (usage response utility, URU) is provided at a server and initiates the process of calculating the usage attribute at the client. URU generates and issues a ping (single request) at pre-set intervals to each client currently receiving continuous updates from the server. The specific client addresses are recorded when the client request to access the web site is first received and allowed. The URU then responds to a received usage attribute packet from the client by parsing the usage attribute packet for the usage value, which is compared against a pre-established threshold minimum value. When the usage value falls below the threshold minimum, the URU either suspends or throttles the sending to the client browser of any updates to the content. The URU automatically resumes the sending of the new content when a subsequent usage attribute indicates a rise above the threshold minimum.

In one embodiment, HTTP/HTML is enhanced to provide information to the server about the current usage level of the continuous data that is being sent to the client. With this information, the server is able to tailor the data being sent to the client based on the current usage level. If the usage level changes in the client system, the server receives information about the changed level so that amount of data being sent can be adjusted (up or down) accordingly. In the exemplary embodiment, the client (browser) is enhanced to determine and send the current usage status and the server is enhanced with the intelligence to tailor the data it sends based on the current usage status received from the client.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is a block diagram illustrating a computer system utilized as a client/server according to one embodiment of the invention;

DETAILED DESCRIPTION OF AN ILLUSTRATIVE EMBODIMENT

The present invention provides a method, system, and computer program product for enabling a server to detect when a client browser or user is not using the continuously updated web pages provided by the server and responding by throttling/suspending the transmission of new content to the client when the client's interface device (e.g., browser) or the content is not being actively utilized. Using a combination of predefined operating conditions, the client browser determines a current usage attribute of the client interface device and received content. The current usage attribute is a calculated number that represents the usage level by the client browser of the content being continually update/transmitted by the server and received at the client interface device. In one embodiment, the attribute is calculated when a ping is received from the server.

A software utility (usage response utility, URU) is provided at a server and initiates the process of calculating the usage attribute at the client. URU generates and issues a ping (single request) at pre-set intervals to each client currently receiving continuous updates from the server. The specific client addresses are recorded when the client request to access the web site is first received and allowed. The URU then responds to a received usage attribute packet from the client by parsing the usage attribute packet for the usage value, which is compared against a pre-established threshold minimum value. When the usage value falls below the threshold minimum, the URU either suspends or throttles the sending to the client browser of any updates to the content. The URU automatically resumes the sending of the new content when a subsequent usage attribute indicates a rise above the threshold minimum.

In one embodiment, HTTP/HTML is enhanced to provide information to the server about the current usage level of the continuous data that is being sent to the client. With this information, the server is able to tailor the data being sent to the client based on the current usage level. If the usage level changes in the client system, the server receives information about the changed level so that amount of data being sent can be adjusted (up or down) accordingly. In the exemplary embodiment, the client (browser) is enhanced to determine and send the current usage status and the server is enhanced with the intelligence to tailor the data it sends based on the current usage status received from the client.

Figure 1A:
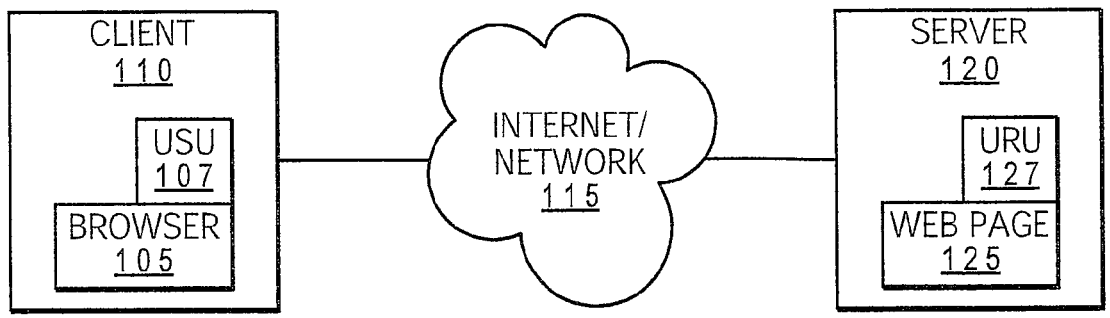
FIG. 1A is a simple network diagram illustrating a single client and server connected via a network within which the features of the invention may advantageously be implemented.

Referring now to the figures, and in particular to FIG. 1A, there is illustrated an exemplary network within which the features of the invention are advantageously implemented. Network 100 comprises client system (or client) 110 and server 120, which are connected to each other via Internet 115. Client 110 is illustrated with two software components relevant to the implementation of the invention. These software components are browser 105 and usage tracking utility (UTU) 107. The basic functionality of browser 105 is known in the art, but is extended herein to provide support for USU 107, whose functionality is described below. Server 120 also includes software components, namely web page 125 and usage response utility (URU) 127. Functionality of URU 127 is described above and web page 125 is assumed to be a series of continuous pages that are continuously updated for the client (or a continuous stream of audio/video/data content).

Both client 110 and server 120 are computer systems, perhaps similar to computer system 200 of FIG. 2. Computer system 200 comprises processor 202, memory 206, and input/output (I/O) controller 208, all interconnected via a system bus 204. I/O controller 340 controls the input and output devices of data processing system 200, of which mouse 212, keyboard 214, display monitor 210, and speaker 211 are illustrated. Display monitor 210 and speaker 211 enables the output of video and audio content, respectively. In addition to the above components, computer system 200 also comprises a network interface device 216, which may be a modem, network interface card, etc. utilized to connect computer system 200 to a network, such as Internet 115 of FIG. 1A.

Located within memory 206 are a number of software programs, including basic input output system (BIOS) 224, operating system (OS) 220, applications 222, and browser 105 (which is also an application). In addition to these software components, computer system is illustrated as having UTU 107, identifying computer system 107 as a client. Notably, computer system may have been illustrated with URU 127 instead of UTU 107 to indicate that the computer system was operating as a server. In yet another embodiment, both UTU and URU may be packaged as a single software package, allowing a single computer system to operate as either a client or server depending on the current use of computer system 200. Finally, while illustrated as a separate utility from browser throughout the invention, it is appreciated that the functionality of UTU 107 may be provided as an additional feature of browser 105, eliminating the need for a separate add-on utility to carry out the features of the invention.

Figure 1B:
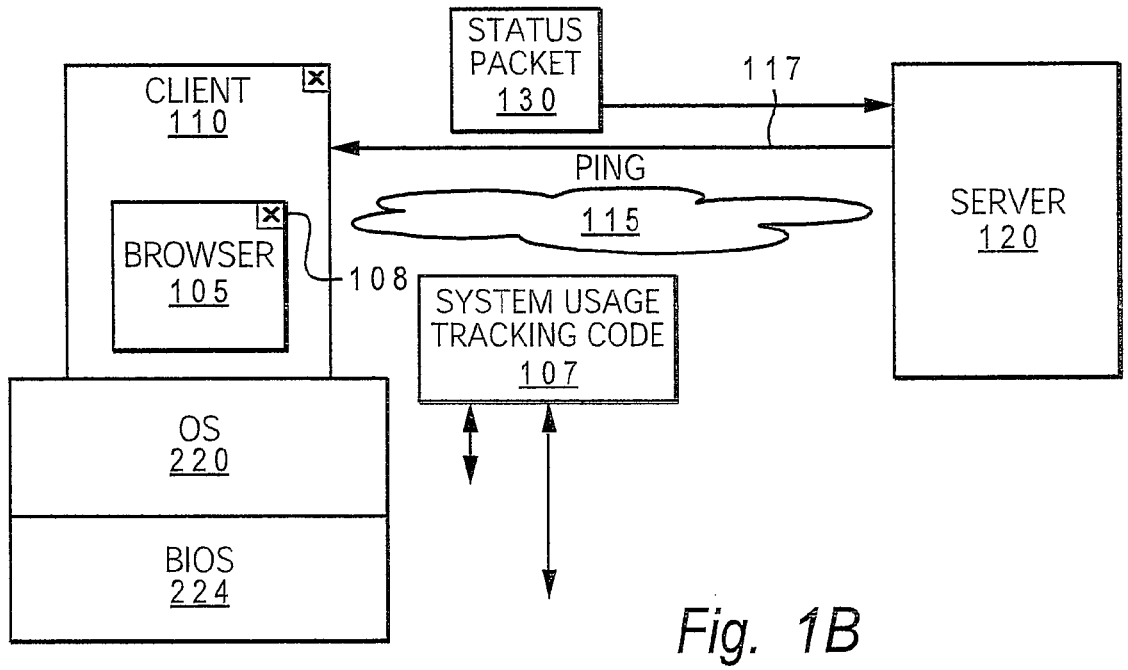
FIG. 1B is a detailed network diagram illustrating the collection and exchange of usage status packets across a network from client to server in accordance with one embodiment of the invention.
Figure 4:
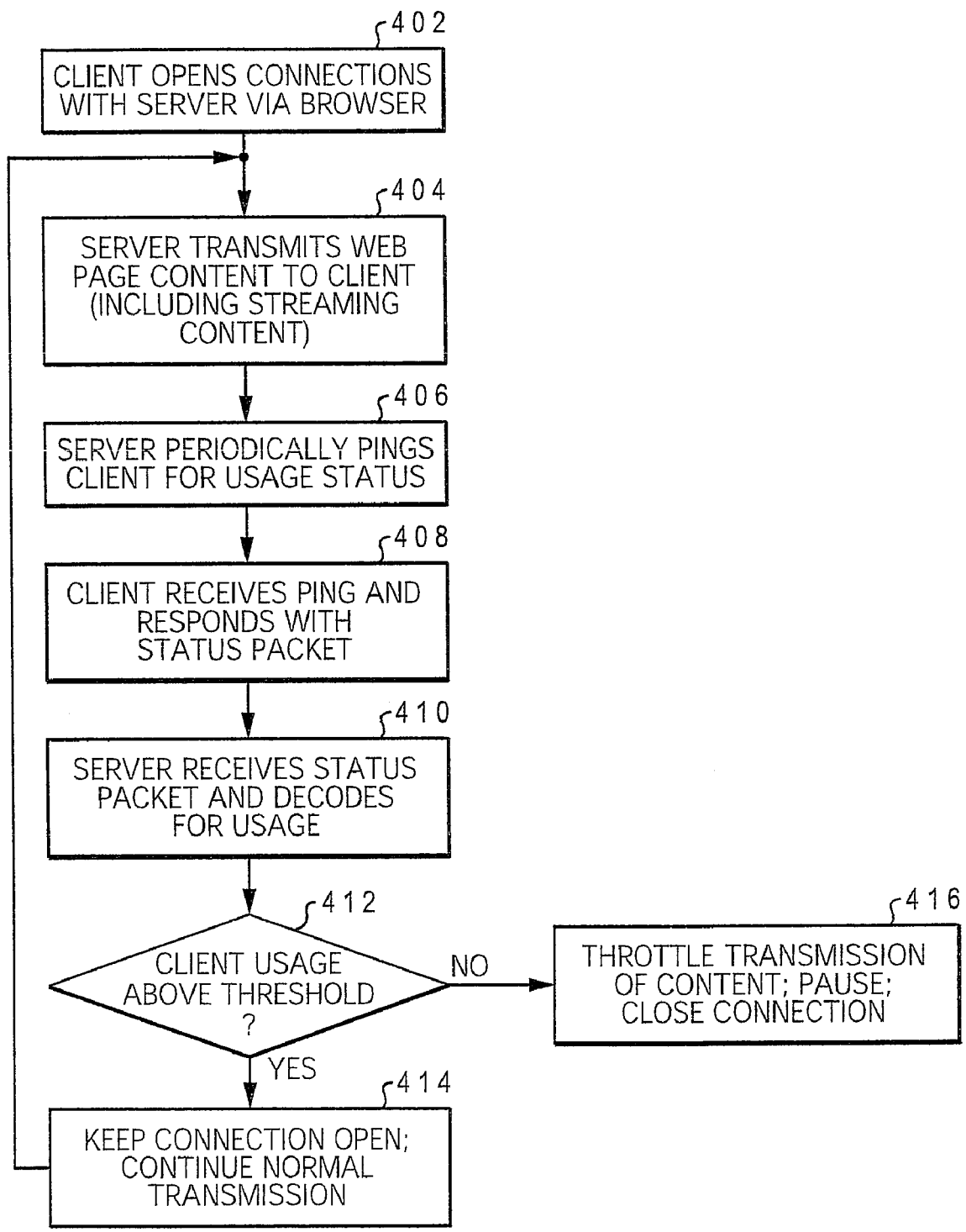
FIG. 4 is a flow chart illustrating the process by which the client usage information is transmitted from client to server and utilized to adjust the level of data transmission from the server in accordance with one embodiment of the invention.

FIG. 1B illustrates both the interactive communication between client browser 105 and the OS 220 and BIOS 224 of client 110 as well as the communication between server 120 and client 110 during execution of the invention. The description of this figure is provided along with that of FIG. 4, which illustrates the processing that is being carried out by the client and the server within the configuration provided by FIG. 1B. The process of FIG. 4 begins at block 402 at which the client 110 initiates a session with the server 120 using the browser 105. The server 120 transmits the content of web page 125 to the client 110 as a continuous stream of data, as stated at block 404. At some pre-established period after the session is established, the server 120 generates and sends out a ping 117 to the client 110 for usage status, as shown at block 406. The client 110 receives the ping and carries out a series of steps which ultimately results in the client 110 returning a status packet 130 to the server 120, as indicated at block 408.

The ping 117 is actually received at the web page, which is enhanced with meta tags for enabling the UTU 107 to obtain current usage information from the client. The meta tags generates a series of status check queries that checks the current status/condition of the operating system 220, BIOS 224 as well as the browser 105 with respect to utilization of the received content. The responses to the queries are returned to the UTU 107, which compiles the information returned to create the usage status packet 130.

To enable the commands to return with relevant information to combine into the status packet 130, certain predefined operating conditions are identified within the UTU 107 as being relevant. The predefined operating conditions may include conditions such as: (1) the browser is closed; (2) the browser is minimized; (3) the browser is hidden behind another window; (4) the screen saver is on; (5) a user response to a usage query is not received; (5) a mute option is selected on the audio player; (6) the volume is zeroed out; (7) the computer screen is turned off; (8) a second stream is detected from another server; etc. Many other conditions may be programmed by the software designer. Specific ones of the conditions may be more relevant depending on the type of content being received at the client system. For example, if the content is audio only, the browser positioning conditions may not be relevant. Likewise, if the content is video only, the mute selection and volume condition would not be relevant. Each condition is allocated a specific point value, and the point value of each relevant condition is summed to create the usage attribute value.

Since several of these conditions involve OS-level and BIOS-level checks (e.g., determining if the browser is minimized and if another window is opened on top of the browser, or if the audio is muted), the UTU 107 issues the commands to the respective OS and BIOS components which will providing the required response information.

Returning now to FIG. 4, once the server 120 receives the usage status packet 130, the URU 127 decodes the packet for the usage information stored therein, as shown at block 410. The usage information (usage attribute value) is compared against a pre-set threshold, and a determination made at block 412 whether the client usage is above the threshold. If the usage is not above the threshold, the transmission of data from the server is throttled or paused as shown at block 416. In some conditions, the transmission may be stopped and the session terminated/closed. When the usage is above the pre-set threshold, however, the server continues to transmit the data normally, as depicted at block 414.

In one embodiment, the level of transmission is adjusted based on the level of client usage. Thus the throttling that occurs at block 416 is continually adjusted based on the current usage level. An inverse correlation is provided between the amount/usage level and the amount of throttling performed. No throttling occurs when the client is actively using the content/browser.

While the invention is described herein with reference to pre-set thresholds and calculated usage attribute value, this provides only a specific embodiment, and is not meant to place any limitations on the invention. Alternate methods of compiling/determining the usage information by the client and determining a response to the usage information received by the server may be provided. For example, when the status packet indicates the screen saver is on or the browser is minimized, the URU 127 may respond by stopping/pausing the streaming of any video. Likewise, when the mute option is selected on the player within the browser or on the computer volume controls, the URU 127 may simply respond by stopping/pausing the audio stream.

Figure 3:
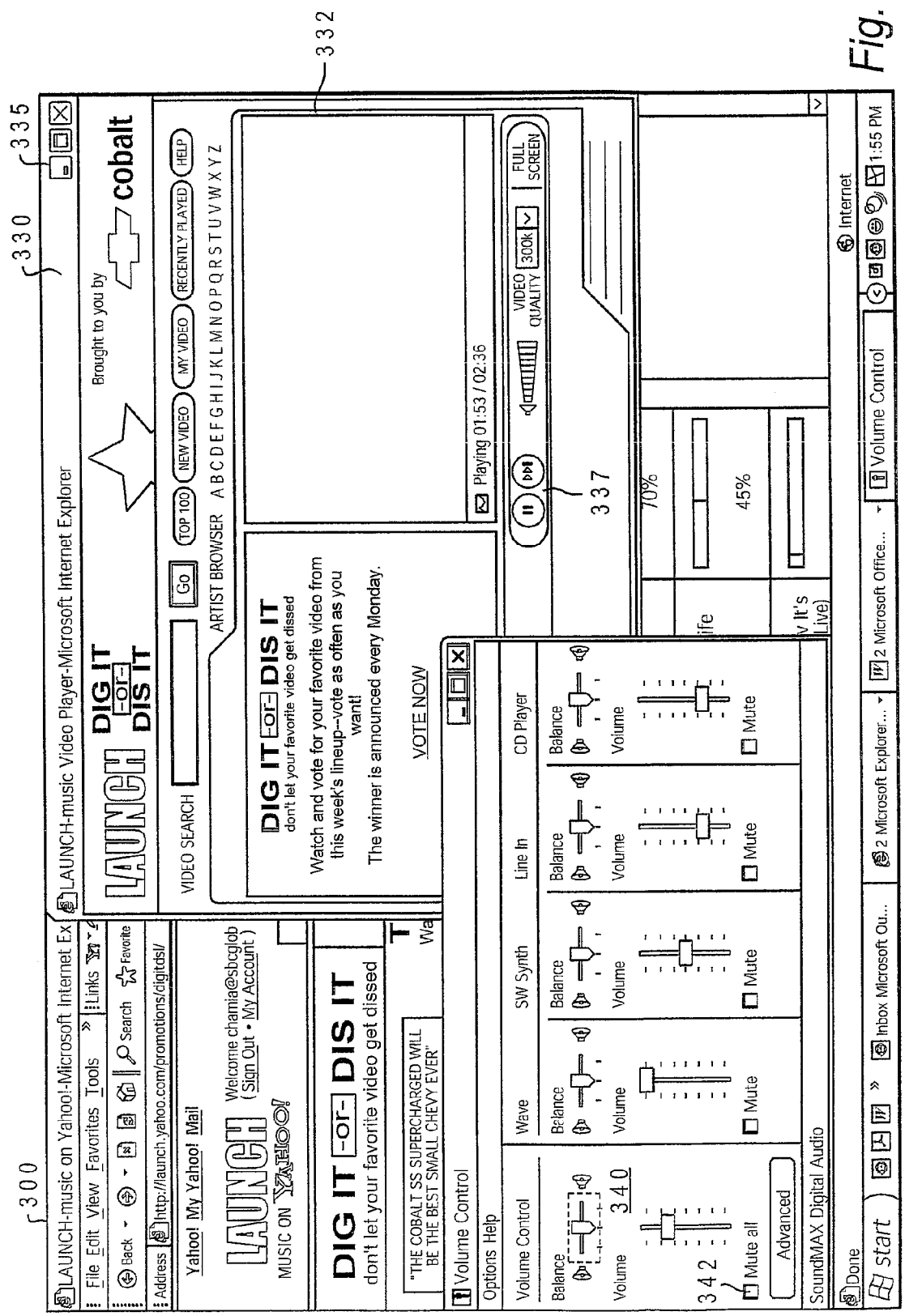
FIG. 3 is a client browser with streaming audio and video content provided via software players/applications and which illustrates one embodiment of the invention.

FIG. 3 provides an exemplary browser with a web page of streaming video and audio content. Browser 300 includes a video player 330 which has associated therewith a video space 332, where a stream of video content is displayed, and video controls 337. On top of browser 300 is opened volume control GUI 340 of the OS. Notably, in addition to volume levels, volume control GUI 340 also includes a mute all option 342. Mute all option 342 mutes all audio on the client, and is thus a condition of relevance to the UTU 107. Likewise, minimize window option 335 allows the user to minimize the streaming video portion of the browser (i.e., the video player 330) and is thus a condition of relevance to the UTU 107. Notably, the first condition (mute all) occurs on the OS level, while the second condition (minimize) occurs on top of the browser level (i.e., the browser itself is not closed).

Selectively turning on/off specific streams (audio or video) is made possible by Stream Control Transmission Protocol (SCTP), which allows the client/server applications to handle different streams differently, while displaying the same output to the user. For example, when streaming a video of a song, the visual streaming may happen independently of the audio streaming. With this flexibility, the usage status can be used very efficiently to control the data flow from the server.

Figure 5:
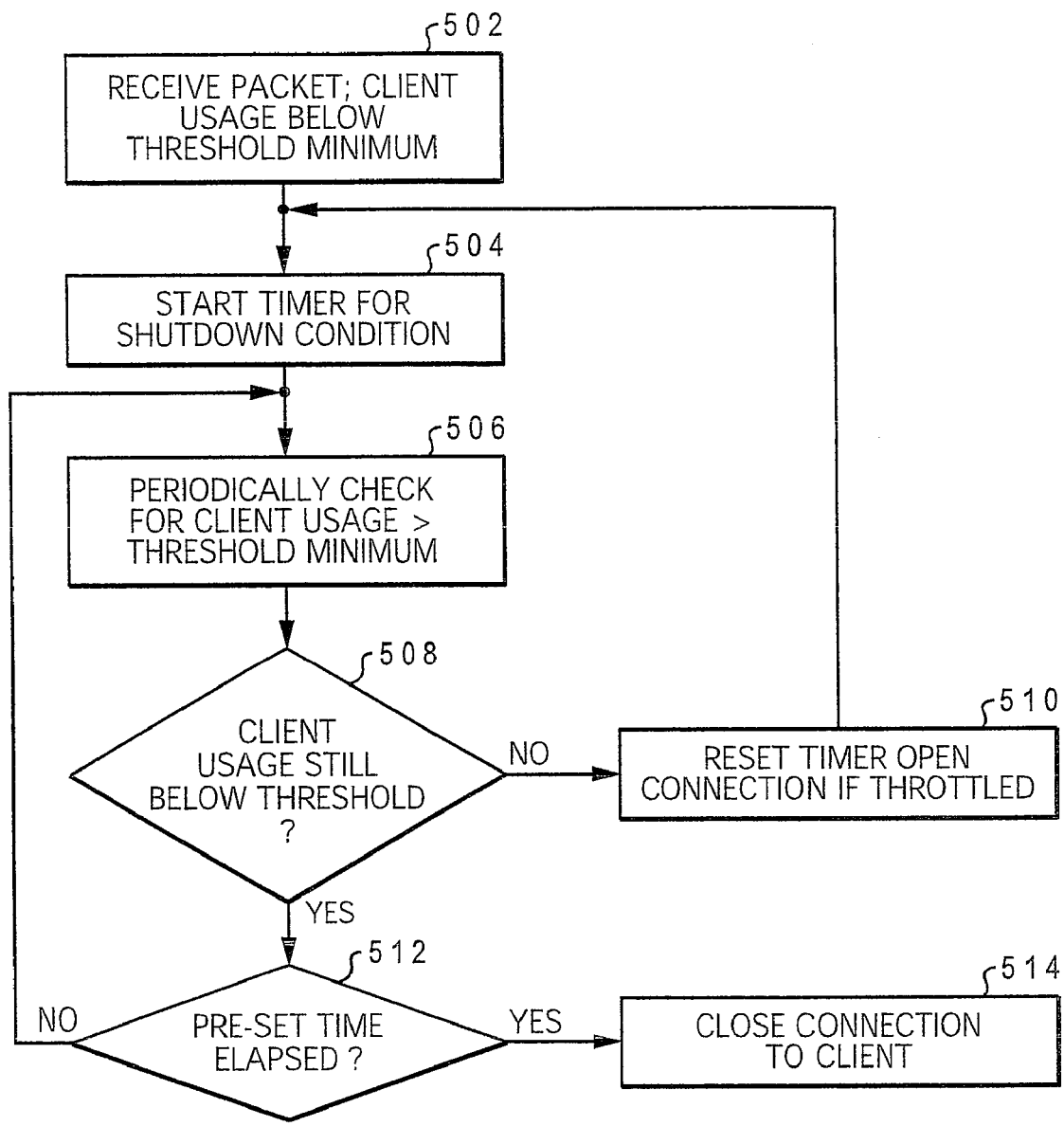
FIG. 5 is a flow chart of the server-side throttling process based on a periodic timer in accordance with one embodiment of the invention.

FIG. 5 indicates the server-side processing of the invention that enables termination (shutdown) of the session. The process begins at block 502, which indicates that the packet is received and the client usage is determined to be below the pre-set threshold. A timer is started by URU 127 for a shutdown condition at block 504. Periodically, as shown at block 506, the URU 127 pings the client to initiate a check of the client usage. A determination is then made at block 508 whether the client usage is still below the threshold, and if not, then the timer is reset at block 510. Also, the connection is reopened if it has been previously throttled.

If the client usage is still below the threshold, a determination is made at block 512 whether the pre-set time for termination of the session has elapsed. When the pre-set time has elapse and the usage is still below the threshold, the session with the client is closed, as shown at block 514. Otherwise the periodic checking of the client usage continues. With the above process, a server is able to close a session when a client has not used the session for a predetermined period of time or when the content begin sent to the client has not being utilized over the predetermined period of time.

Figure 6:
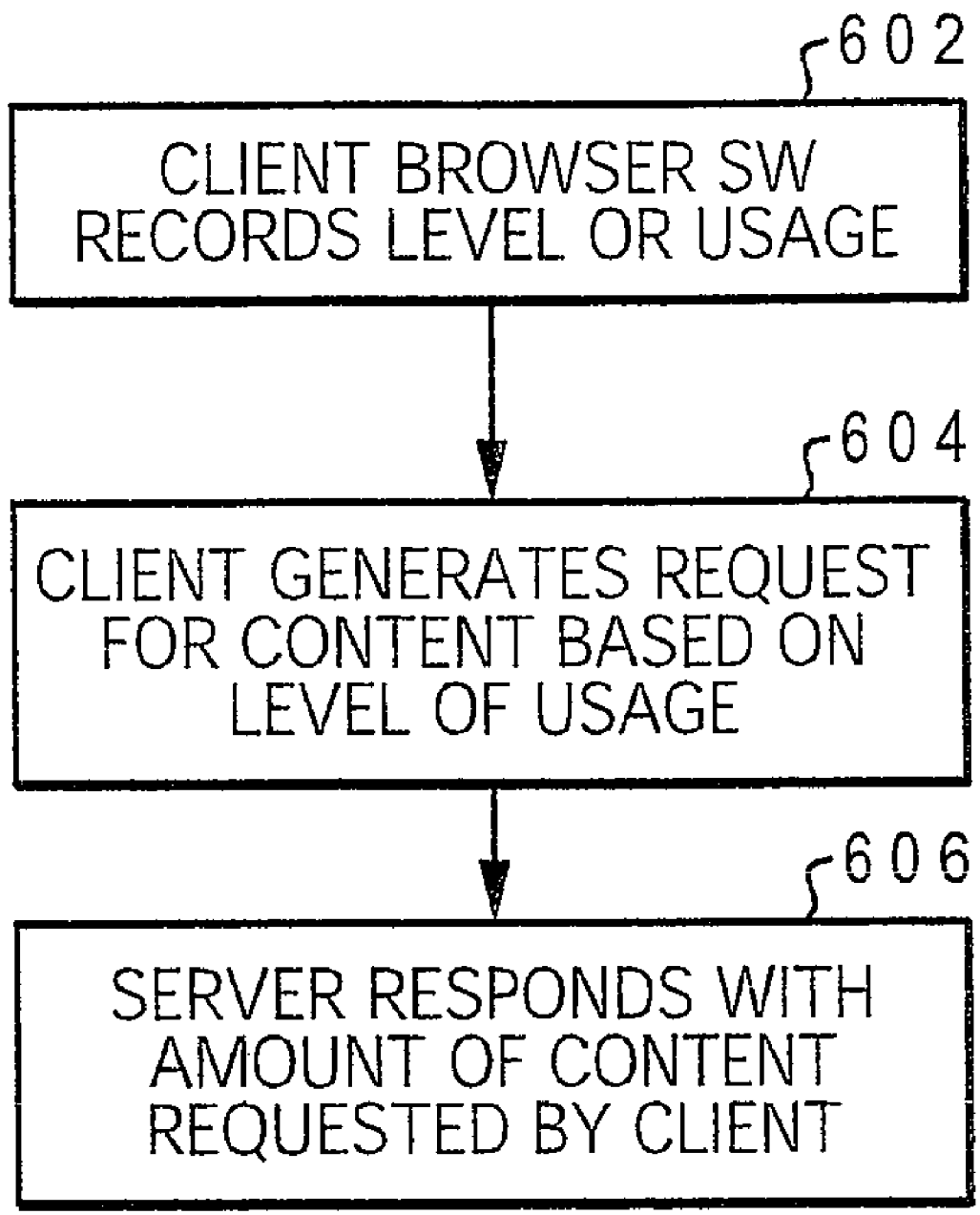
FIG. 6 is a flow chart illustrating a process by which the client determines the level of data transmission in accordance with one alternate embodiment of the invention.

In the above described methodologies, the intelligence to use the usage status lies with the server since the client informs the server about the current usage status only when the client receives a ping sent by the server. In an alternate embodiment, illustrated by FIG. 6, the client initiates the call on what/how much/what type of content to request (or how to redefine the request) based on the independent client determination of current usage status (i.e., without first receiving a ping). At block 602 the UTU 107 of the client browser records the level of usage. Then, at block 604, the client dynamically generates a request for a calculated amount/type of content based on the level of usage recorded. Finally, the server responds with the amount of content requested by the client, as indicated at block 606. Because accessing web sites on the Internet from a client (browser) works based on request-response architecture enforced by HTTP, this alternate embodiment is not very much in line with the client-server architecture and is thus more difficult to define/implement.

The above described features of the invention make the web server aware of the usage status of the client. In one embodiment, the web server defines the possible usages of the web pages it serves. The possible usages are defined by extending/defining HTML meta-tags. The client browser is then able to let the server know if any of those usage statuses changed. HTTP is enhanced to provide ways for the client to inform the server of the usage status. Based on the current usage status (as provided by the client browser), the server tailors the data that is provided to the client.

Among the advantages provided by the invention are the following: (1) Implementation of the invention eliminates the unnecessary transmission of data that is not currently used by and hence improve the available network bandwidth; (2) The usage status can be defined in a way that enables the server to find out which portion of the web page the user is interested in. The server is able to cache this information and use the information in the future. This functionality enables intelligent caching methodologies in the server side and hence improves the network bandwidth availability; (3) The idea of sharing the usage levels and the current usage status may be applied to various other client server architectures where data transfer can be minimized; and (4) Implementation of the invention enables data flow optimization to be completed between the server and client in a manner transparent to the user.

Some instances where the features of the invention may be advantageously utilized are self-refreshing pages like live news updates, election result updates, sports score updates etc. If the browser is minimized or the screen saver is up, there is no need for the server to send the refreshed updates to the browser. Thus with the implementation of the invention other advantages includes (1) audio streaming in an Audio+Video stream may be avoided if there is no sound card; (2) audio streaming may be avoided if the speaker is muted; and (3) video streaming may be eliminated when the browser is minimized or the screen saver is on.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for controlling data flow across a computer network having a data transmission device and a data receiving device, said method comprising:
   determining a current usage level for data received at the data receiving device; and
   periodically issuing a query from the data transmission device across the network to the data receiving device, said query requesting a response from the data receiving device indicating the current usage level;
   receiving the response from the data receiving device;
   comparing the current usage level against one or more pre-established thresholds to determine whether the current usage level indicated within the response falls below the pre-established threshold for sustaining a current transmission level;
   throttling the flow of data across said network to said data receiving device based on the current usage level, wherein the flow of data is reduced or stopped when the current usage is below the pre-established threshold and wherein the flow of data is increased when the current usage is above the pre-established threshold and the flow is not at a maximum available flow;
   wherein said throttling includes;
      determining a time period during which said current usage level is below the pre-established threshold;
      stopping said flow of data when the time period is greater than a pre-established maximum period during which the flow of data may continue while the usage level is below the pre-established threshold; and
      when a flow of data has been throttled/suspended/stopped, restoring the level of flow of data to the data receiving device when a subsequent usage level indicated within a subsequent response is above the pre-established threshold.

2. The method of claim 1, further comprising responding to the current usage level being below a pre-established threshold in one or more of multiple ways, including:
   suspending the flow of data to the data receiving device, wherein:
   when the data flow is a video stream, suspending the transmission of the video stream to the data receiving device; and
   when the data flow is an audio stream, suspending the transmission of the audio stream to the data receiving device.

3. The method of claim 1, further comprising:
   responsive to receipt of a request for usage level data, initiating said determining of the usage level at the data receiving device;
   sending out an internal query for usage level information within the data receiving device, wherein said internal request includes a status check for current status information from the operating system;

compiling the current status information received in response to the status check into a usage level packet; and transmitting a usage level packet containing the usage level data from the data receiving device to the data transmission device.

4. The method of claim 1, further comprising:

independently initiating said determining of the usage level at the data receiving device;

selecting a level of data flow to request from the data transmission device; and forwarding the level of data flow request to the data transmission device to affect possible changes in the received data flow, wherein the data receiving device controls the level of data flow received at the data receiving device based on the determined current usage level.

5. The method of claim 4, wherein the initiating, selecting and forwarding are performed by a usage monitoring utility within the device receiving the flow of data.

6. The method of claim 4, wherein the server and transmission protocol includes separate utilities that enable the flow of data to be controlled via the level of data flow request and the usage level of transmitted data.

7. A computer program product comprising:

a computer readable storage medium; and program code on said computer readable storage medium for:

determining a current usage level for data received at the data receiving device by periodically issuing a query from a data server across a network to a data receiving device, said query requesting a response indicating the current usage level of data being transmitted to the data receiving device:

responding to the current usage level being below or above one or more pre-established thresholds in one or more of multiple ways, by throttling the flow of data across said network to said data receiving device based on the current usage level, wherein said throttling of the flow of data is based on a determination whether the current usage level falls below or above a pre-established threshold for sustaining a current transmission level, said throttling including:

suspending the flow of data to the data receiving device, wherein:

when the data flow is a video stream, suspending the transmission of the video stream to the data receiving device;

when the data flow is an audio stream, suspending the transmission of the audio stream to the data receiving device; and stopping said flow of data when the elapsed time period during which said current usage level is below the pre-established threshold is greater than a pre-established maximum period during which the flow of data may continue while the usage level is below the pre-established threshold; and when a flow of data has been throttledIsuspended/stopped, restoring the level of flow of data to the data receiving device when a subsequent usage level is above the pre-established threshold.

8. The computer program product of claim 7, further comprising program code for:

responsive to receipt of a request for usage level data, initiating said determining of the usage level at the data receiving device;

sending out an internal query for usage level information within the data receiving device, wherein said internal request includes a status check for current status information from the operating system;

compiling the current status information received in response to the status check into a usage level packet; and transmitting a usage level packet from the data receiving device to the data transmission device.

9. The computer program product of claim 7, further comprising program code for:

independently initiating said determining of the usage level; and selecting a level of data flow to request from the data transmission device; and forwarding the level of data flow request to the data transmission device to affect possible changes in the received data flow, wherein the data receiving device controls the level of data flow received at the data receiving device based on the determined current usage level.

10. A network comprising:

a server that provides data that is continuously updated and that includes a usage response utility that responds to receipt of usage level information for clients receiving the data by throttling the flow of data when the usage level information indicates that a client is not currently using the data being provided, wherein said usage response utility comprises means for:

periodically issuing a query from the server across the network to the data receiving device for a response indicating the current usage level;

receiving the response from the data receiving device:

performing said throttling of the flow of data based on a determination that the current usage level falls below a pre-established threshold for sustaining a current transmission level;

responding to the current usage level being below a pre-established threshold in one or more of multiple ways, including:

suspending the flow of data to the data receiving device, wherein:

when the data flow is a video stream, suspending the transmission of the video stream to the data receiving device:

when the data flow is an audio steam, suspending the transmission of the audio stream to the data receiving device; and stopping said flow of data when an elapsed time period during which said current usage level is below the pre-established threshold is greater than a pre-established maximum period during which the flow of data may continue while the usage level is below the pre-established threshold; and when a flow of data has been throttle/suspended/stopped, restoring the level of flow of data to the data receiving device when a subsequent usage level is above the pre-established threshold; and a client that receives said data via a network connection and that includes a usage tracking utility executing therein, which enables the client to track the current usage level for the data being received from the server and inform the server of the current usage level, wherein said usage tracking utility of said client comprises means for:

responsive to receipt of a request for usage level data: initiating said determining of the usage level at the client; and sending out an internal query for usage level information within the client,
wherein said internal request includes a status check for current status information from the operating system; and
compiling the current status information received in response to the status check into a usage level packet; and
transmitting the usage level packet to the server.

11. The network of claim 10, wherein said usage tracking utility of said client comprises means for:
independently initiating said determining of the usage level; and
selecting a level of data flow to request from the data transmission device; and
forwarding the level of data flow request to the data transmission device to affect possible changes in the received data flow, wherein the data receiving device controls the level of data flow received at the data receiving device based on the determined current usage level.

12. A network server comprising:
a web page for displaying continuously updated content;
means for transmitting the continuously updated content to a client via the web page; and
a software utility that enables a current usage level of the content at the client to be determined and responds to the current usage level by controlling the amount of content being transmitted to the client, wherein said software utility includes means for
generating and transmitting to the client a query requesting the current usage level;
wherein said query is transmitted within the web page, which has meta tags associated therewith for triggering a check at the client of the current usage level for the content being transmitted to the client;
wherein said software utility controls the amount of content by:
allowing transmission of full content when the current usage level is above a pre-established threshold;
throttling the amount of content provided when the usage level falls below a first threshold; and
stopping the transmission of all content when the usage level falls below the first threshold for greater than a pre-set amount of time; and
when a transmission of data has been throttle/suspended/stopped, restoring the level of transmission of data to the client when a subsequent usage level is above the pre-established threshold.

13. The network server of claim 12, wherein said throttling the amount of content includes:
when the data flow is a video stream, suspending the transmission of the video stream to the data receiving device; and
when the data flow is an audio stream, suspending the transmission of the audio stream to the data receiving device.

* * * * *